A. J. KELLOGG.
STEERING WHEEL LOCK.
APPLICATION FILED SEPT. 20, 1915.
1,169,965.
Patented Feb. 1, 1916.
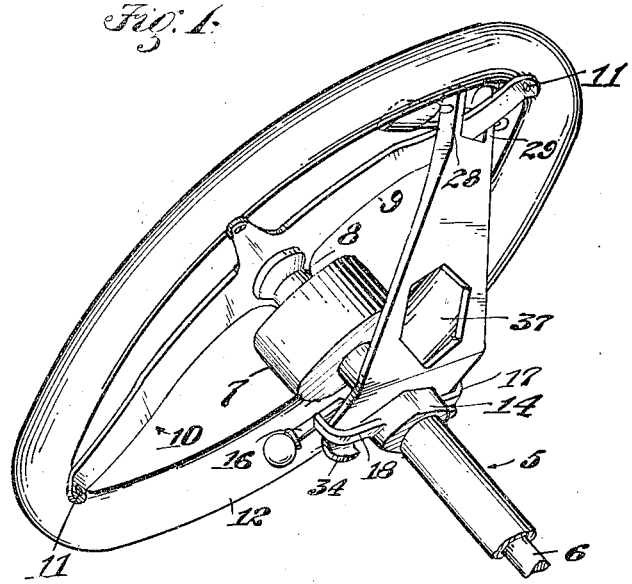
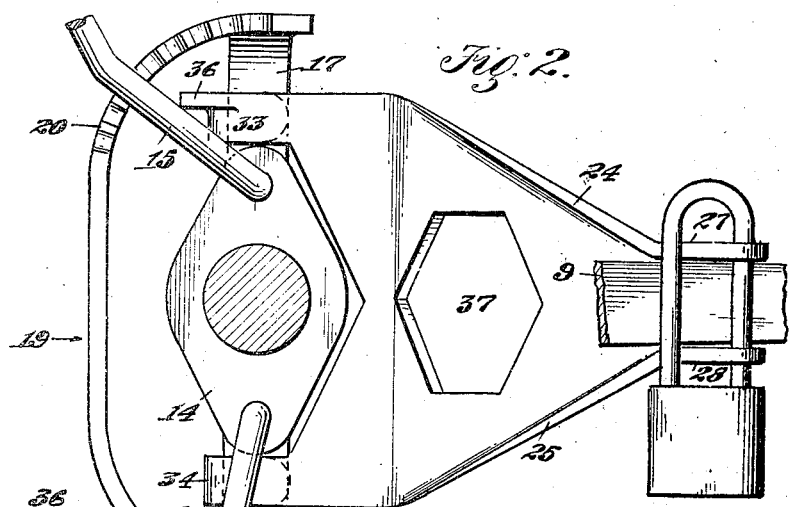
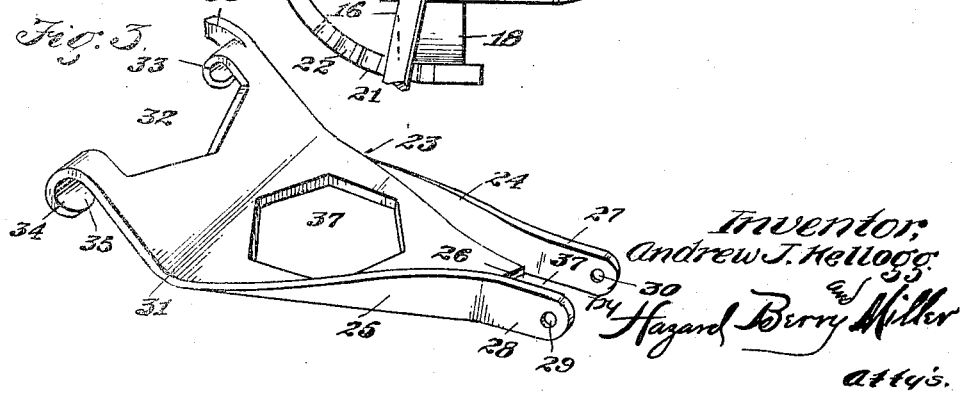
Inventor,
Andrew J. Kellogg
by Hazard Berry Miller
attys.

UNITED STATES PATENT OFFICE.

ANDREW J. KELLOGG, OF LOS ANGELES, CALIFORNIA.

STEERING-WHEEL LOCK.

1,169,965.   Specification of Letters Patent.   Patented Feb. 1, 1916.

Application filed September 20, 1915.   Serial No. 51,510.

*To all whom it may concern:*

Be it known that I, ANDREW J. KELLOGG, a citizen of the United States, residing at Los Angeles, in the county of Los Angeles and State of California, have invented new and useful Improvements in Steering-Wheel Locks, of which the following is a specification.

My invention relates to locks for automobiles, and more particularly to locking means which may be applied to the steering gear, and is especially adapted for use upon the steering column of automobiles of the Ford type.

It is an object of my invention to provide means for holding the steering wheel against rotation and for locking the steering gear against motion, so as to prevent the automobile from being steered from side to side and thus effectively inhibit its use by unauthorized persons.

It is a further object of my invention to provide a portable steering gear locking device which may be readily attached to fixed brackets already a part of the steering column, the opposite end of the device engaging one of the arms of the steering gear spider.

Another object of my invention is to provide a demountable means for immovably holding a steering wheel and which can be detachably locked against removal by means of a padlock.

It is another object to provide means upon the device for holding the spark control lever in an advanced position so that starting of the engine will be rendered difficult or prevented, thus further hindering the use of the vehicle.

It is a further object of my device to provide a locking means which is adapted to be used upon the steering gear of cars of the above mentioned type without alteration of the parts of the car.

Another object is to provide a locking device of simple and cheap construction which may be readily applied to a steering gear and which, when not in use, may be taken off and placed in a storage compartment.

An incidental object of my construction is to provide within the structure of the locking device suitable nut-engaging means for use as a wrench on the hub caps of the wheels so as to enhance its value as a convenient accessory.

My invention is more particularly illustrated in the accompanying drawings in which:

Figure 1 is a perspective view showing the device as applied to the steering wheel and in its locked position. Fig. 2 is a view in plan of Fig. 1 with parts broken away. Fig. 3 is a perspective view of the device as removed.

More specifically, 5 indicates the steering column of an automobile within which is the steering gear post 6 connecting at its lower end with suitable members for controlling the courses of the vehicle as is common in automobile construction. The upper end of the steering gear post extends into a gear housing 7, where it receives its force of rotation through suitable gearing which is interposed between the end of the column and the short extending steering shaft 6. The shaft 8 extends upwardly from the casing and is secured to the steering wheel spider. The arms 9 of the steering wheel spider 10 are secured by screws 11 to the steering wheel rim 12 in the usual manner.

Mounted upon the steering column at a point below the housing 7 is a quadrant bracket 14. The bracket 14 serves as a bearing for the spark control lever 15 and the gasolene control lever 16. The arms 17 and 18 are rigidly mounted on the bracket 14 and extend outwardly on diametrically opposite sides from each other and have a quadrant member 19 mounted upon their outer extremities. The quadrant 19 is composed of two complementary quadrant portions 20 and 21, having notches 22 formed upon the upper face thereof, the notches 22 being of sufficient depth to engage the shank of the spark and gasolene control levers and holding them in any desired position.

My locking device preferably consists of a single piece of sheet metal of approximately uniform thickness throughout and formed in the desired figuration, as particularly shown in Fig. 3.

23 indicates the body plate, having gradually up-turned flanges 24 and 25 along a portion of its sides until the terminating ends of which project from the end 26 of the body plate to form parallel ears 27 and 28. The ears have opposed holes 29 and 30 adapted to receive the hasp of a padlock. The opposite end of the body plate is up-turned at a point 31 from whence it extends at an angle to the main body plate. The outer end of said angle portion is split, or forked, as indicated at 32 and formed into two quadrant bracket arm-engaging members 33 and 34. These members are hook-shaped and the throat 35 formed between their terminating ends and the body plate is of sufficient width to allow the members 17 and 18 to freely pass through and lie in an engaging position within the hook portion.

Formed upon the member 33 is a spark control lever obstructing lug 36. This lug is adapted to extend into the path of travel of the spark control lever and to hold it in an advanced position when the locking device is in use upon the car. Formed within the body plate is a hexagonal opening 37 adapted to fit the hub caps of the car upon which the device is used and at the same time serving the double purpose of materially decreasing the weight of the device.

In operation, my device is applied as particularly disclosed in Fig. 1. The steering gear wheel is brought into such a position that one of the spider arms is in a plane directly above the steering column. When an arm is in this position, it stands in a plane above and between the quadrant bracket arms. My device may then be readily applied by first hooking the engaging members 33 and 34 over the quadrant bracket arms and swinging the device upward until the spider arms lies within the opening 37 between the ears 27 and 28. When in this position, the hasp-receiving openings in these lugs will be above the spider arm and will allow the hasp of the padlock to be passed through them and its end be secured within the body of the padlock. The steering gear is now in a locked position and if the front wheels of the automobile are turned in, toward the curb or from the road, it will be seen that it will be impossible for a person to drive the car away.

As a further guard against the possibility of the car being stolen, the lug 36 has been provided, and when the device is in its locked position, as described, this lug will hold the spark lever in its advanced position upon its quadrant, so that the spark may not be retarded, and if an effort is made to start the engine, it will usually back-fire, thus making it difficult, and, at some times, impossible to start the engine.

It will thus be seen that my locking device, while simple in construction and application, both prevents the operation of the engine and locks the steering wheel.

While I have described the device as engageable with the segment carrying brackets on a steering column, it is manifest that in instances where such brackets are not used, other means may be employed for attaching the device to the steering column. Furthermore, any suitable means for attachment to the steering wheel may be resorted to.

I claim:

1. The combination with a steering wheel, a steering wheel column and a quadrant bracket mounted upon said column, of demountable means having a forked end non-rotatably engageable with the quadrant bracket and means for locking said first-mentioned means to the steering wheel whereby said wheel is held against rotation.

2. The combination with a steering wheel, a steering wheel column and a quadrant bracket mounted on said column, of a plate formed with a forked end engageable with the quadrant bracket and means for locking said plate to the steering wheel, whereby the latter is held against rotation.

3. The combination with a steering wheel, a steering wheel column and a quadrant bracket mounted on said column, of a plate formed with a forked end detachably engageable with the quadrant bracket, ears on the opposite end of the plates adapted to engage the wheel, and a lock on said ears for holding the plate against removal.

4. The combination with a steering wheel, a steering wheel column, a quadrant bracket on said column, and a spark controlling lever pivoted on the column, of a plate, means thereon for detachably connecting the plate to the quadrant, means for detachably connecting the plate to the steering wheel, and means on the plate for holding the spark lever in an advanced position.

5. The combination with a steering wheel, a steering wheel column, a quadrant bracket mounted on said column, and a spark controlling lever pivoted on the column, of a plate formed with a forked end, hooks on the forks for detachably engaging the quadrant bracket, a pair of perforated spaced ears on the opposite end of said plate adapted to engage the steering wheel, a lock adapted to connect the ears to hold the plate against detachment, and a projection on one of the forks for holding the spark lever in an advanced position.

In testimony whereof I have signed my name to this specification.

ANDREW J. KELLOGG.